US012597411B2

(12) United States Patent
Feng

(10) Patent No.: US 12,597,411 B2
(45) Date of Patent: Apr. 7, 2026

(54) SYSTEMS AND METHODS FOR VIRTUAL MICROPHONES IN ACTIVE NOISE CANCELLATION

(71) Applicant: Harman International Industries, Incorporated, Stamford, CT (US)

(72) Inventor: Tao Feng, Novi, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 206 days.

(21) Appl. No.: 18/677,718

(22) Filed: May 29, 2024

(65) Prior Publication Data

US 2025/0372074 A1 Dec. 4, 2025

(51) Int. Cl.
*G10K 11/178* (2006.01)

(52) U.S. Cl.
CPC .. *G10K 11/17881* (2018.01); *G10K 11/17823* (2018.01); *G10K 11/17825* (2018.01); *G10K 11/17854* (2018.01); *G10K 2210/1082* (2013.01); *G10K 2210/1282* (2013.01)

(58) Field of Classification Search
CPC ....... G10K 11/17813; G10K 11/17815; G10K 11/17817; G10K 11/17823; G10K 11/17825; G10K 11/17854; G10K 11/17881; G10K 2210/1082;
(Continued)

(56) References Cited

U.S. PATENT DOCUMENTS 11,741,937 B1 * 8/2023 Bastyr .............. G10K 11/17821 381/71.4
2022/0059069 A1 * 2/2022 Kim ..................... G10K 11/178
(Continued)

FOREIGN PATENT DOCUMENTS

CN 117292670 A 12/2023

OTHER PUBLICATIONS

Feng, T. et al., "Systems and Methods for Subband Adaptive Filtering for Enhanced Active Noise Cancellation in Vehicles," U.S. Appl. No. 63/627,632, filed Jan. 31, 2024, 44 Pages.
(Continued)

*Primary Examiner* — Jason R Kurr
(74) *Attorney, Agent, or Firm* — McCoy Russell LLP

(57) ABSTRACT

Methods and systems are disclosed for a vehicle audio system including, in one example, a method for noise cancellation in a vehicle having a reference sensor configured to acquire a reference signal, a plurality of speakers configured to emit a noise cancellation signal, and a plurality of error microphones configured to acquire a residual signal. The method processes the reference signal with a time domain adaptive weight filter to produce the noise cancellation signal, estimates a frequency domain filtered virtual microphone signal from the noise cancellation signal and the residual signal, and a frequency domain filtered reference signal from the reference signal. The method decomposes the frequency domain filtered virtual microphone signal and the frequency domain filtered reference signal into a plurality of frequency domain subband signals, and updates the time domain adaptive weight filter based on a weight transformation of a plurality of frequency domain subband adaptive filter weights.

20 Claims, 7 Drawing Sheets

(58) Field of Classification Search
CPC . G10K 2210/1282; G10K 2210/30232; G10K 2210/3025
See application file for complete search history.

(56) References Cited

U.S. PATENT DOCUMENTS

| | | | | |
|---|---|---|---|---|
| 2023/0129022 | A1* | 4/2023 | Pepin | G10K 11/17854 381/71.4 |
| 2024/0029704 | A1* | 1/2024 | Von Elling | G10K 11/17881 |

OTHER PUBLICATIONS

Feng, T., "Systems and Methods for Subband Virtual Path Calculation in Active Noise Cancellation," U.S. Appl. No. 18/612,531, filed Mar. 21, 2024, 42 pages.
Das, D. et al., "A computationally efficient frequency-domain filtered-X LMS algorithm for virtual microphone," Mechanical Systems and Signal Processing, vol. 37, No. 1-2, May 2013, 15 pages.
Li, X. et al., "A survey on filtered-x least mean square-based active noise control systems with emphasis on reducing computational complexity," EURASIP Journal on Advances in Signal Processing, vol. 2023, No. 128, Dec. 9, 2023, 30 pages.
European Patent Office, Extended European Search Report Issued in Application No. 25176882.6, Sep. 12, 2025, Germany, 19 pages.

* cited by examiner

SYSTEMS AND METHODS FOR VIRTUAL MICROPHONES IN ACTIVE NOISE CANCELLATION

FIELD

The disclosure relates to systems and methods for active noise cancellation, and in particular, systems and methods for calculating estimated virtual microphone signals and adjusting an adaptive weight filter based on the estimated virtual microphone signals.

BACKGROUND

Active noise cancellation (ANC) technology is a method used to generate sound waves that destructively interfere with undesired sound waves. The destructively interfering sound waves may be produced by a transducer, such as a loudspeaker, to combine with the undesired sound waves. This technology is widely used in various applications, including headphones, residential and commercial buildings, and automotive environments, to create a quieter and more comfortable acoustic experience. In automotive applications, ANC systems are particularly beneficial for reducing road noise, engine noise, and other external sounds that can penetrate the cabin of a vehicle, thereby enhancing the comfort of passengers.

In current automotive applications, virtual microphone technology (VMT) may be used. In an automotive application, it may be desirable to cancel noise in the vicinity of the ears of a driver or passenger but it may be impractical to place a microphone in those locations. The location of one or more virtual microphones may be the areas where noise cancellation is attempted. VMT systems in automotive applications may include one or more physical microphones placed within the vehicle cabin and a virtual microphone (VM) algorithm that calculates soundwaves that may be produced by a transducer, such as a speaker within the vehicle, to create a quiet area in the location of the virtual microphone or microphones. Conventional VM algorithms are based on a time domain Filtered-X Least Mean Square (FXLMS) algorithm or a time-frequency domain FXLMS algorithm.

However, the inventors herein have recognized potential issues with such systems. The FXLMS algorithm has inherent structural limitations when applied to a VMT system. The structural limitations restrict the VM performance on broadband noise cancellation, and particularly in reducing high frequency noise. Meanwhile, the conventional VM algorithms process the signal on a sample-by-sample basis, which poses a significant burden on the computational resources of the system. In particular, the FXLMS algorithm demands significant computational power to perform effectively, which may increase the amount of space and power computational devices within the vehicle. Adapting the FXLMS algorithm with a subband adaptive filtering (SAF) algorithm has demonstrated some reduction to computational demand and increased performance in broadband noise cancellation over the conventional approaches, however further gains are desired.

SUMMARY

The present application provides systems and methods for virtual microphone technology (VMT) in active noise cancellation systems (ANC), particularly in cancelling high-frequency noise incident on ears of a listener. The application discloses an approach including a time frequency subband virtual microphone (TFSVM) algorithm that addresses the computational limitations of traditional VMT systems and increases noise reduction in the broadband frequency range.

In a first aspect, a method is provided for noise cancellation in a vehicle having a reference sensor configured to acquire a reference signal correlated to noise within a vehicle cabin, a plurality of speakers positioned within the vehicle cabin configured to emit a noise cancellation signal to cancel noise around ears of one or more vehicle occupants, and a plurality of physical error microphones positioned with the vehicle cabin configured to acquire a residual signal. The method includes processing the reference signal with a time domain adaptive weight filter to produce the noise cancellation signal and estimating a frequency domain filtered virtual microphone signal from the noise cancellation signal and the residual signal, and a frequency domain filtered reference signal from the reference signal. The method includes decomposing the frequency domain filtered virtual microphone signal and the frequency domain filtered reference signal into a plurality of frequency domain subband signals. A frequency domain subband adaptive filter is calculated for each subband of the plurality of frequency domain subband signals to produce a plurality of frequency domain subband adaptive filters. The method includes updating the time domain adaptive weight filter based on a weighted transformation of the plurality of frequency domain subband adaptive filters.

In a second aspect, a noise cancellation system is provided for a vehicle including a reference sensor configured to acquire a reference signal correlated to noise within a vehicle cabin, a time domain adaptive weight filter in electronic communication with the reference sensor, configured to apply an adaptive filtering process to the reference signal to produce a noise cancellation signal to cancel noise around ears of one or more vehicle occupants, a plurality of speakers positioned within the vehicle cabin and in electronic communication with the time domain adaptive weight filter, configured to emit the noise cancellation signal into the vehicle cabin, and a plurality of physical error microphones positioned within the vehicle cabin and configured to acquire a residual signal resulting from interaction of the noise cancellation signal and the noise within the vehicle cabin. The system includes a signal processing unit in electronic communication with the reference sensor, the plurality of speakers, and the plurality of physical error microphones. The signal processing unit includes a processor and a non-transitory memory storing a set of frequency domain subband filters, and instructions. When executing the instructions, the processor is configured to estimate a frequency domain filtered virtual microphone signal from the noise cancellation signal and a residual physical error microphone signal, and a frequency domain filtered reference signal from the reference signal. The processor is configured to decompose the frequency domain filtered virtual microphone signal and the frequency domain filtered reference signal into a plurality of frequency domain subband signals, and calculate a frequency domain subband adaptive filter for each subband of the plurality of frequency domain subband signals to produce a plurality of frequency domain subband adaptive filters. The processor is configured to update the time domain adaptive weight filter based on a weighted transformation of the plurality of frequency domain subband adaptive filters.

In a third aspect, a method for noise cancellation in a vehicle is provided. The method includes acquiring a reference signal using a reference sensor, wherein the reference signal is correlated with noise in a vehicle cabin. The reference signal is processed with a time domain adaptive weight filter to produce a noise cancellation signal, which is emitted to cancel noise around ears of one or more vehicle occupants using a plurality of speakers positioned in the vehicle cabin. The method includes acquiring a residual signal from a plurality of physical error microphones positioned in the vehicle cabin and transforming the noise cancellation signal, the residual signal, and the reference signal into a frequency domain noise cancellation signal, a frequency domain residual signal, and a frequency domain reference signal, respectively, using a Fast Fourier Transform (FFT). The method includes applying a plurality of secondary path filters to the frequency domain noise cancellation signal and the frequency domain residual signal to produce a frequency domain filtered estimated virtual microphone signal, and to the frequency domain reference signal to produce a frequency domain filtered reference signal. A set of frequency domain subband filters are applied to decompose the frequency domain filtered reference signal and the frequency domain filtered estimated virtual microphone signal respectively into a plurality of frequency domain subband filtered reference signals and a plurality of frequency domain filtered estimated virtual microphone signals, and a frequency domain subband gradient is calculated for each subband based on a frequency domain subband reference signal and a frequency domain subband error signal. The method includes determining a frequency domain normalized step size for each subband based on a power contribution of the frequency domain subband reference signal and the frequency domain subband error signal. The method includes updating a set of frequency domain subband adaptive filter weights based on the frequency domain subband gradient and the frequency domain normalized step size to produce an updated set of frequency domain subband adaptive filter weights. The method includes transforming the updated set of frequency domain subband adaptive filter weights from a frequency domain to a time domain using an Inverse Fast Fourier Transform to produce an updated time domain adaptive weight filter. The method includes emitting the noise cancellation signal based on the updated time domain adaptive weight filter to reduce noise around the ears of the one or more vehicle occupants.

In this way, the disclosed systems and methods reduce more broadband road noise in the vicinity of the ears of one or more vehicle occupants while demanding less computational resources than conventional VM approaches.

BRIEF DESCRIPTION OF THE DRAWINGS

The disclosure may be better understood from reading the following description of non-limiting embodiments, with reference to the attached drawings, wherein below.

DETAILED DESCRIPTION

In one of many exemplary embodiments, an active noise cancellation (ANC) system as described herein may reduce undesired sound present in an environment. Undesired sound is sound that is annoying to a listener such as vehicle engine sound, road noise etc., but undesired sound can also be music or speech of others when, for example, the listener wants to make a telephone call. The disclosed systems and methods include a Virtual Microphone (VM) algorithm for Active Noise Cancellation (ANC) systems. The VM algorithm reduces the noise around ears of one or more vehicle occupants, regardless of error microphone placement. The disclosed approach addresses a number of challenges that beset conventional VM algorithms, including structural limitations that limit the broadband frequency noise reduction performance of conventional approaches, and the signal processing demands which pose a significant computational burden on conventional VM systems.

To address the aforementioned challenges, a new Time Frequency Subband Virtual Microphone (TFSVM) algorithm is proposed, based on a time frequency domain subband adaptive filter structure. Compared with the conventional VM algorithms, the TFSVM algorithm calculates the estimated virtual microphone signal in each subband, and individually updates an adaptive filter on each frequency range. The approach significantly reduces the computational load. Furthermore, to increase the performance and convergence speed of the disclosed TFSVM algorithm, a method of subband flexible adaptation step size normalization is applied. In this way, the approach reduces more broadband noise in the vicinity of the ears of the vehicle occupants at the same time demanding less computational power than conventional approaches.

Figure 1:
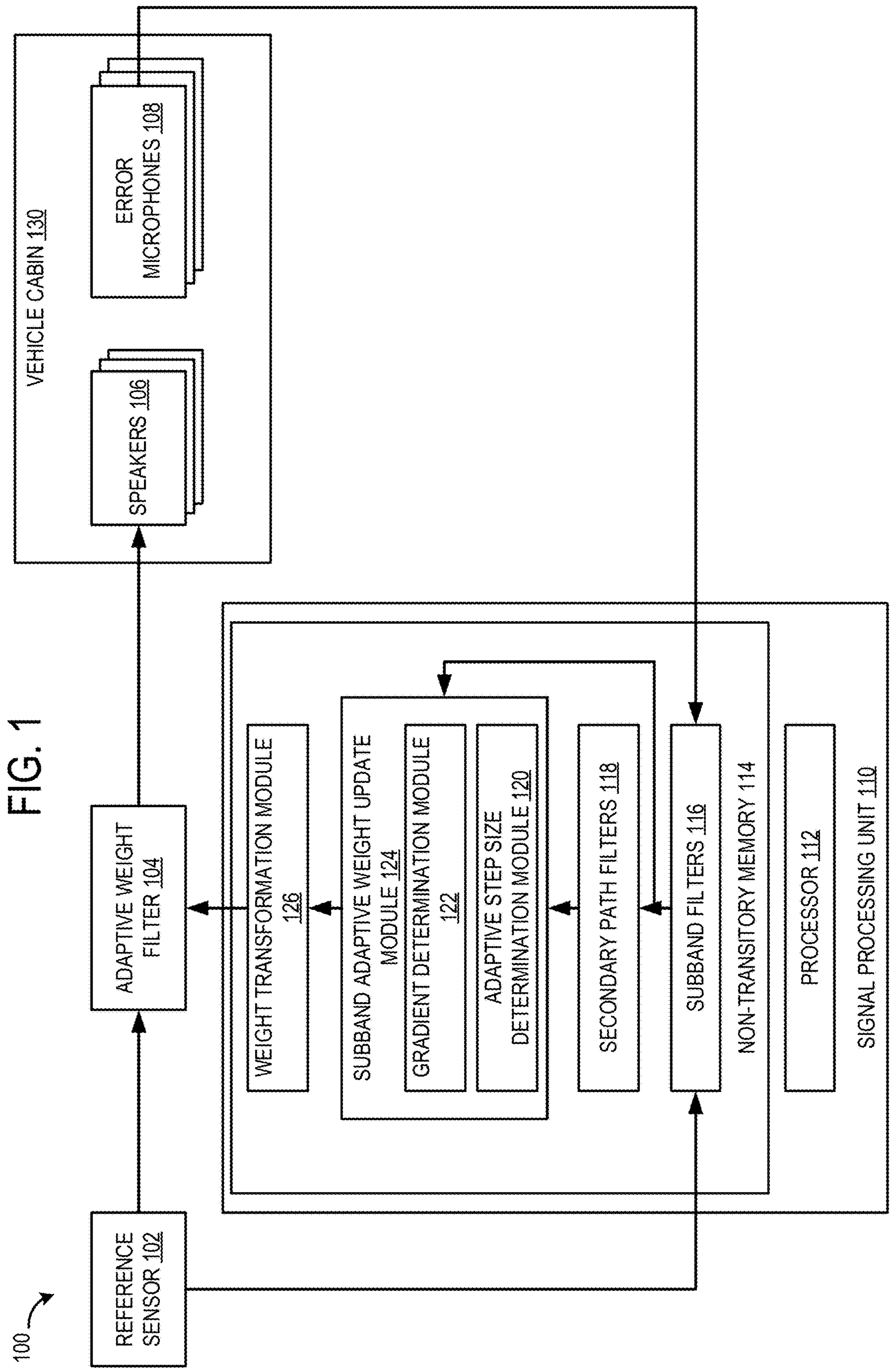
FIG. 1 illustrates a schematic diagram of an active noise cancelling system, according to one or more embodiments of the current disclosure.
Figure 2:
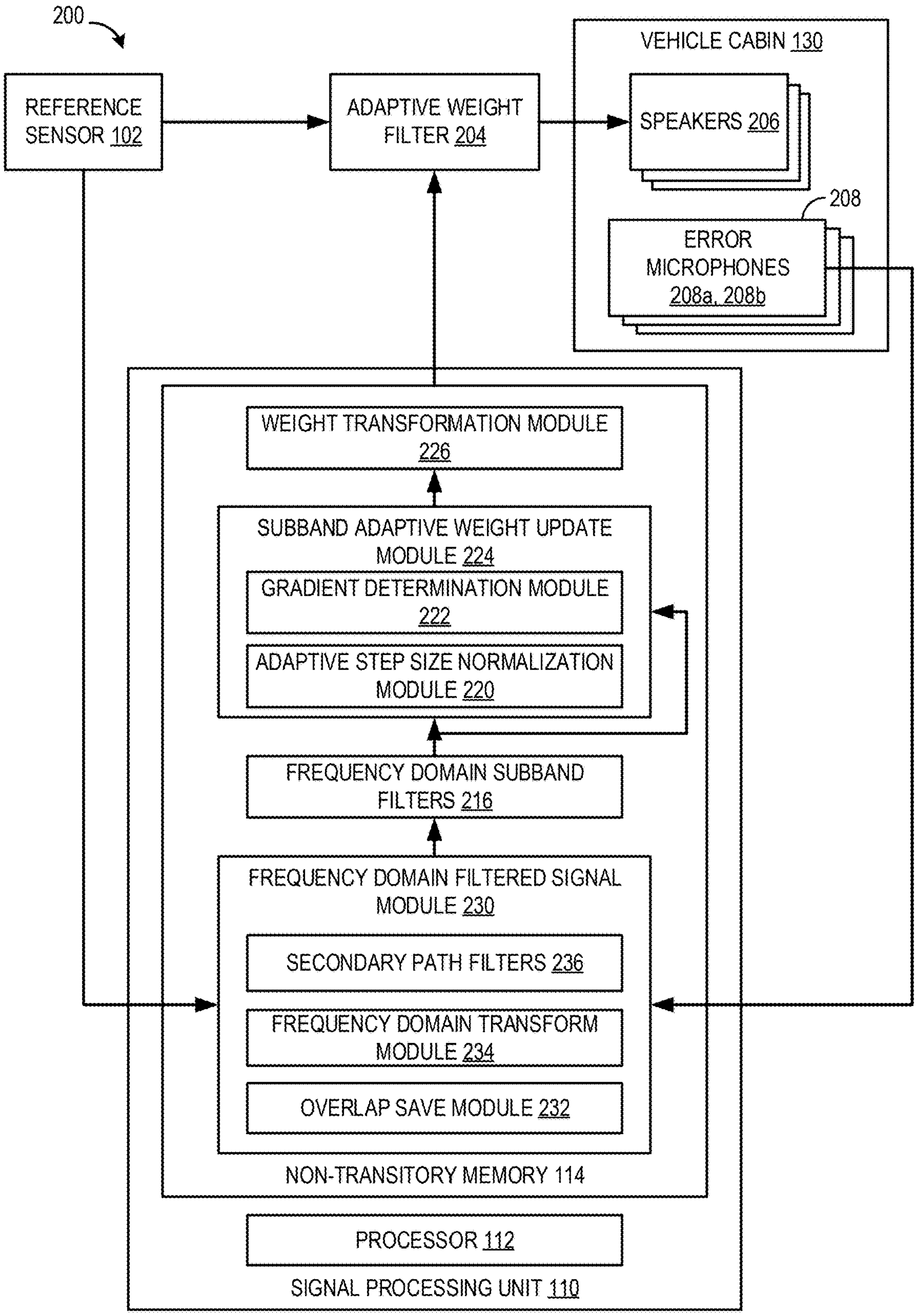
FIG. 2 illustrates a schematic diagram of a virtual microphone noise cancellation system, according to one or more embodiments of the current disclosure.
Figure 3:
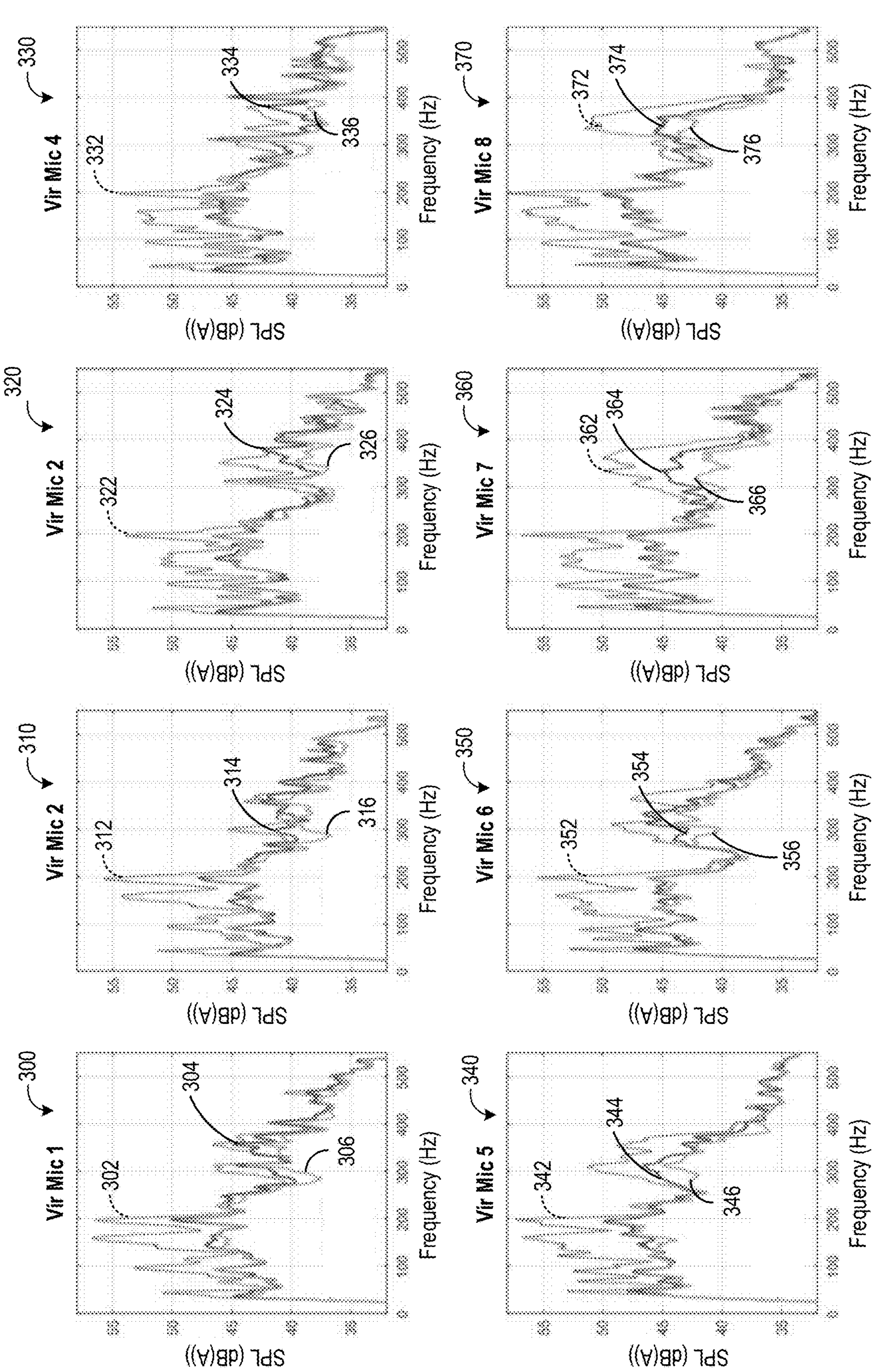
FIG. 3 is a graph showing a performance comparison between a traditional virtual microphone noise cancellation algorithm and the proposed Time Frequency Subband Virtual Microphone (TFSVM) algorithm, according to one or more embodiments of the current disclosure.
Figure 4:
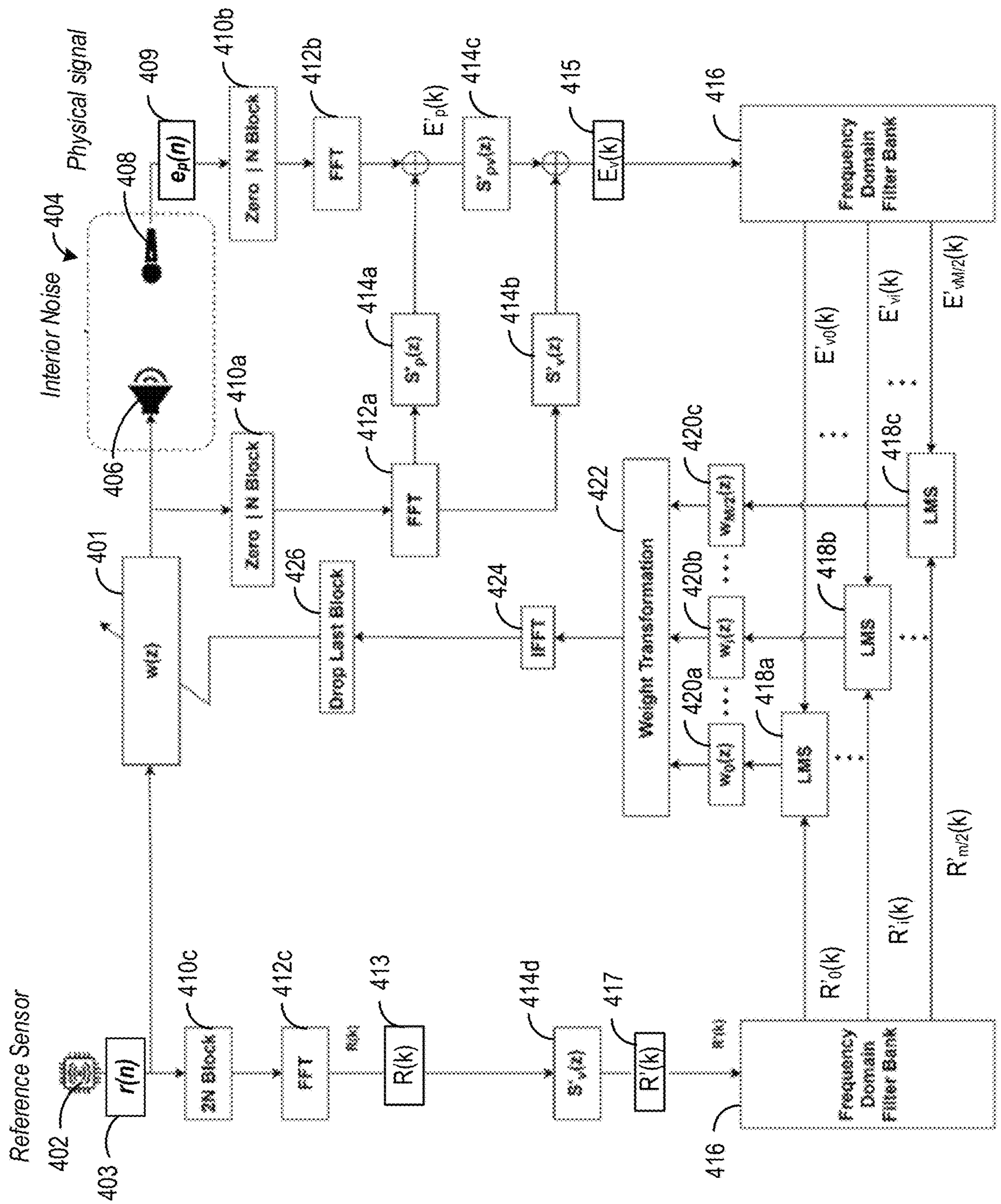
FIG. 4 shows a schematic of a TFSVM algorithm, according to one or more embodiments of the present disclosure.
Figure 5A:
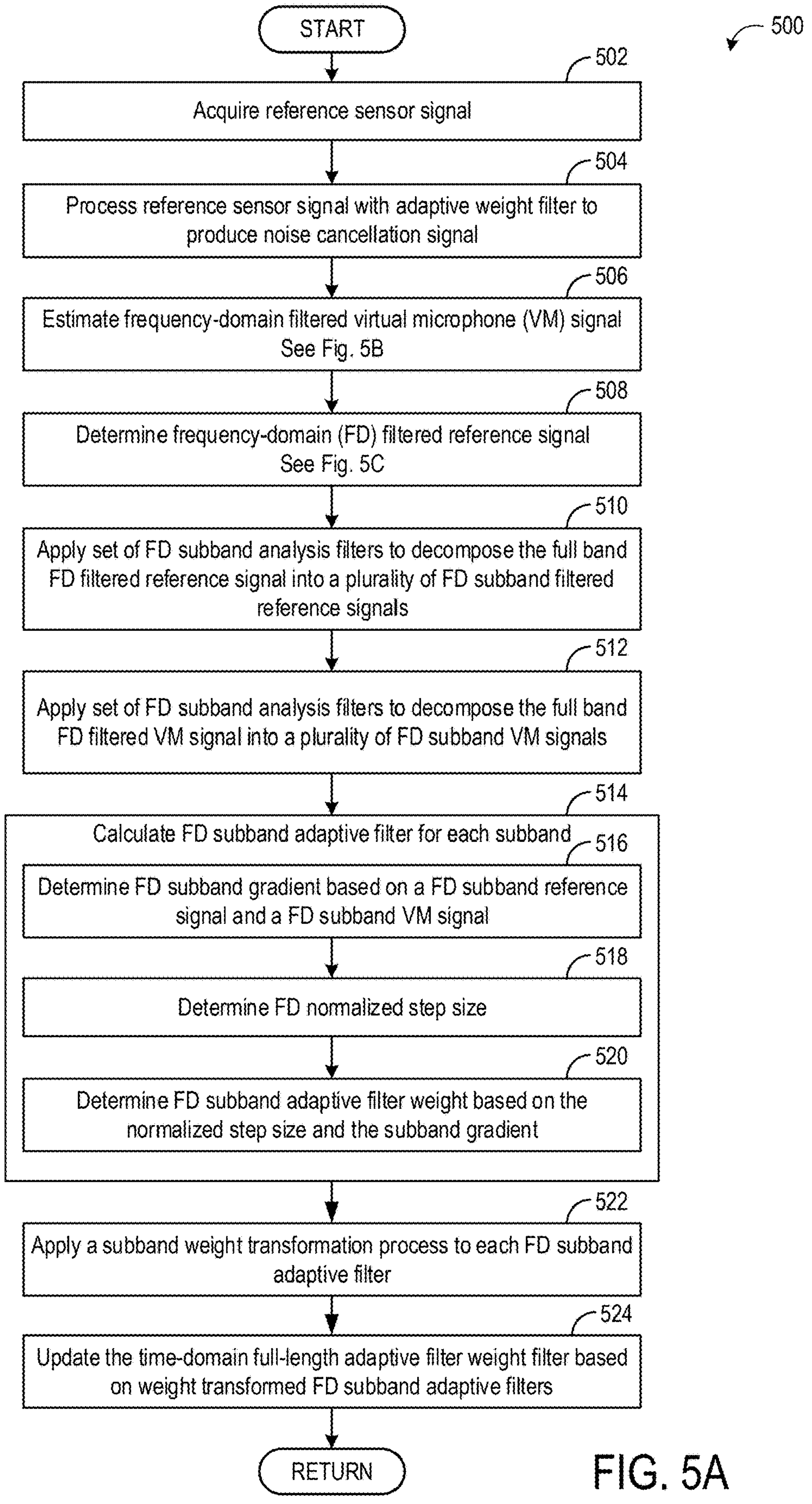
FIG. 5A shows a flow chart illustrating an example method for active noise cancellation using a TFSVM algorithm in accordance with one or more embodiments of the present disclosure.
Figure 5B:
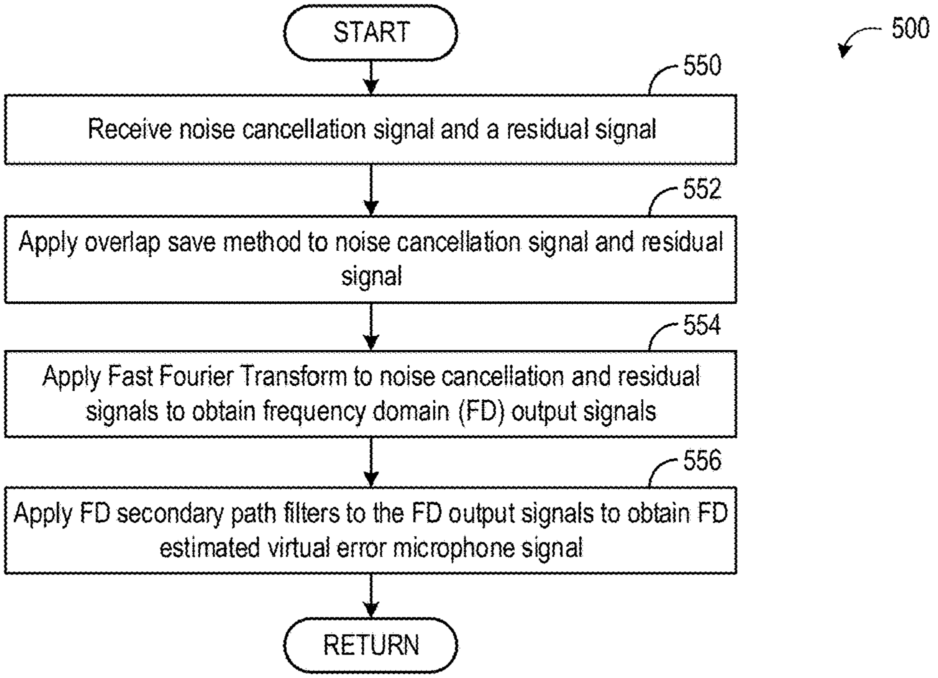
FIG. 5B shows a flow chart continuing from the example method of FIG. 5A in accordance with one or more embodiments of the present disclosure.
Figure 5C:
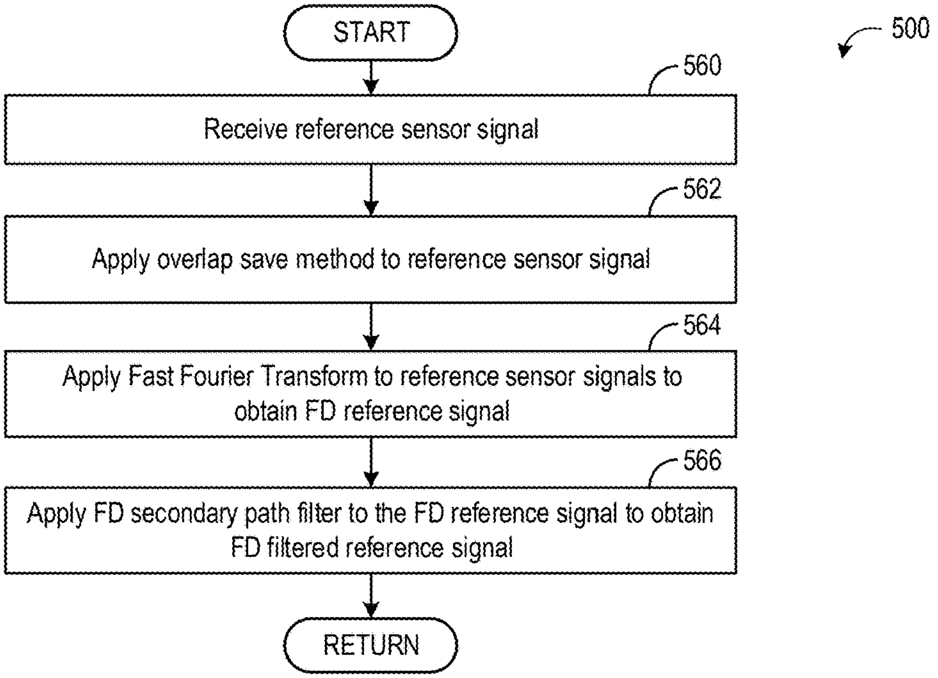
FIG. 5C shows a flow chart continuing from the example method of FIG. 5A in accordance with one or more embodiments of the present disclosure.

The figures below may display aspects of the system and methods claimed herein. FIG. 1 is a schematic diagram of a noise cancellation system. The noise cancellation system may contain a plurality of error microphones, processors, and speakers capable of detecting ambient noise within a vehicle cabin, processing the ambient noise to determine a signal to output to the speakers that cancels the ambient noise in the vehicle cabin. FIG. 2 is a schematic diagram of a virtual microphone noise cancellation system. One embodiment of a noise cancellation system in a vehicle involves the use of virtual microphones, where noise cancellation may be focused on a position where there are no physical microphones and the position may be referred to as the location of a virtual microphone. In this case, the noise detected by physical microphones within the cabin may be processed to predict the sound at the location of a virtual microphone. The predicted sound at the location of the virtual microphone may be used to determine the signal that the speakers produce to cancel noise at the location of the virtual microphone, and may be used to determine the remaining noise at the location of the virtual microphone after noise cancellation has been performed. The remaining noise may be analyzed for further refinement of the noise cancellation signal. FIG. 3 is a graph that compares the broadband noise cancellation performance achieved by a conventional VM algorithm and the proposed TFSVM algorithm is proposed based on a time frequency domain subband adaptive filter structure. FIG. 4 is a schematic representation of the TFSVM algorithm including estimating virtual microphone signals block-by-block in the frequency domain, which reduces computational complexity, and includes application of a time frequency subband adaptive filter structure, which updates all adaptive filters in each subband across the entire frequency range. FIGS. 5A-C are flowcharts that describe a method implementing the TFSVM algorithm schematically depicted in FIG. 4.

Turning to FIG. 1, it shows a block diagram of a vehicle noise cancelling system 100. The vehicle noise cancelling system 100 is configured to enhance the acoustic environment within a vehicle cabin 130 by actively reducing unwanted noise. The vehicle noise cancelling system 100 is equipped with a reference sensor 102, which is tasked with acquiring a reference signal that correlates with the noise present within the vehicle cabin 130. This reference signal serves as the basis for generating a noise cancellation signal that counteracts the detected noise. In a few examples, the reference sensor 102 may include at least one of an accelerometer configured to detect vibrations associated with the vehicle, a microphone configured to detect ambient noise outside the vehicle cabin, and a non-acoustic sensor configured to detect operational parameters of the vehicle indicative of noise generation.

The vehicle noise cancelling system 100 comprises an adaptive weight filter 104, which processes the reference signal obtained by the reference sensor 102 and applies an adaptive filtering algorithm to produce the noise cancellation signal. The adaptive weight filter 104 is capable of adjusting its filtering characteristics dynamically to reduce a residual signal acquired via a plurality of error microphones 108.

The vehicle noise cancelling system 100 includes a plurality of speakers 106 strategically positioned within the vehicle cabin 130. The speakers 106 are configured to emit the noise cancellation signal into the cabin space, thereby creating an anti-noise sound field that interferes with the unwanted noise to reduce or eliminate it.

To monitor the effectiveness of the noise cancellation process, a plurality of error microphones 108 are also positioned within the vehicle cabin 130. In one example, the plurality of error microphones 108 may include one or more physical error microphones and one or more virtual error microphones, which are described in more detail with reference to FIG. 2. These error microphones 108 capture the residual signal, which is the resultant sound after the interaction of the emitted noise cancellation signal with the original noise. The residual signal provides feedback on the performance of the vehicle noise cancelling system 100. For example, reducing the residual signal captured by the plurality of error microphones may indicate greater effectiveness of the noise cancellation process.

A signal processing unit 110 serves as the computational hub of the vehicle noise cancelling system 100. The signal processing unit 110 is in electronic communication with both the reference sensor 102 and the error microphones 108. The signal processing unit 110 houses a processor 112 and a non-transitory memory 114, which together execute machine-readable instructions for cancelling noise within vehicle cabin 130. The processor 112 in the signal processing unit 110 is a hardware component designed to execute machine executable instructions stored in non-transitory memory 114, including instructions for computational tasks for real-time signal processing, including adaptive filtering algorithms, subband decomposition, and gradient calculations for filter weights. The processor 112 processes data to generate a real-time noise cancellation signal that counteracts unwanted noise in the vehicle cabin 130.

The non-transitory memory 114 stores machine-readable instructions and data for the vehicle noise cancelling system 100, maintaining this information even when the system is off. It contains firmware, software, and data structures or databases used by the processor 112, and may include ROM, flash memory, or other non-volatile storage technologies. The non-transitory memory 114 also holds historical data and adaptive filter coefficients for system learning and performance enhancement.

The signal processing unit 110 of the vehicle noise cancelling system 100 uses a set of subband filters 116 to decompose audio signals into multiple frequency subbands. The subband filters 116 are designed to divide the broad frequency range of the reference and residual signals into narrower bands, allowing noise cancellation strategies tailored to acoustic properties of each subband. The subband filters 116 start with a prototype lowpass filter, which is then modulated to create a series of bandpass filters covering the entire frequency range of interest.

The impulse response of each subband filter, denoted as hm, is obtained from the prototype filter by a modulation process that shifts the filter's passband to the frequency range of the target subband. The impulse response for the $m^{th}$ subband filter is determined using a mathematical transformation that includes the effects of modulation and windowing. The number of subbands, M, and the length of each subband filter, $l_{sw}$, are parameters that affect the resolution and computational demands of the subband filtering process. The subband filters 116 are utilized on the reference and residual signals through filter bank analysis. This involves convolving the input signals with the impulse responses of each subband filter to isolate the subband components. The outputs are sets of subband reference signals and subband error signals, which reflect the frequency content of the original signals within each subband. By operating in the subband domain, the vehicle noise cancelling system 100 can more effectively execute the noise cancellation task by focusing on and canceling specific frequencies of sound.

Secondary path filters 118 are applied to the subband reference signals to produce filtered subband reference signals. These secondary path filters 118 model the acoustic transfer function from the speakers 106 to the error microphones 108 within each subband. These filters reflect the characteristics of the vehicle cabin's acoustic environment, which includes cabin geometry, upholstery materials, and the variable presence of passengers or cargo. Each secondary path filter in secondary path filters 118 corresponds to a particular subband and processes the associated subband reference signal, taking into account the frequency-dependent behavior of sound transmission, including reflection, absorption, and diffraction. The secondary path filters may be learned in a secondary path calibration process, as previously disclosed. To maintain accuracy, the system may include a calibration mechanism that adjusts filter coefficients in response to environmental changes.

An adaptive step size determination module 120 is included in the signal processing unit 110. The adaptive step size determination module 120 adjusts the step size in the adaptive filtering algorithm of the vehicle noise cancelling system 100 on a per subband basis. This adjustment affects the convergence rate and stability of the adaptive filter weights within the adaptive weight filter 104. The adaptive step size determination module dynamically modifies the step size in each subband based on the power contribution of the error microphone signals and the reference signals within each respective subband, which affects convergence speed and stability of the adaptive filter weights. The adaptive step size determination module 120 calculates a normalized step size for each subband by evaluating factors such as the sum power of the filtered reference signal and the error signal, the individual power contributions of these signals, and a smoothness parameter related to their power. The module may also consider a power contribution parameter reflecting the maximum power within each subband. The resulting normalized step size is then applied to update the subband adaptive filter weights, seeking to balance between convergence speed and stability.

Gradient determination module 122 calculates the subband gradient for each subband based on the filtered subband reference signals and the corresponding subband error signals. This continuous real-time adjustment allows the vehicle noise cancelling system 100 to adapt effectively to varying noise conditions, improving the acoustic experience inside the vehicle cabin.

Subband adaptive weight update module 124 updates the adaptive filter weights in each subband based on the calculated gradients and the determined adaptive step sizes. The subband adaptive weight update module 124 ensures that the vehicle noise cancelling system 100 adapts in real-time to the noise conditions within the vehicle cabin 130.

Weight transformation module 126 integrates the updated adaptive filter weights from each subband to produce the final weights for the adaptive weight filter 104 in the time domain. These updated weights are then applied to the adaptive weight filter 104 to adjust the noise cancellation signal for optimal noise reduction within the vehicle cabin 130.

FIG. 2 shows a block diagram of a VM noise cancellation system 200. The VM noise cancellation system 200 is configured reduce interior noise around ears of a driver or a passenger, regardless of error microphone placement. In one example, the VM noise cancellation system 200 may be included in a multiple-input multiple-output (MIMO) active noise cancellation system as part of the overall approach to reduce unwanted noise, e.g., road noise. In one example, the VM noise cancellation system 200 may be included in the vehicle noise cancelling system 100 within the vehicle cabin 130.

The VM noise cancellation system 200 includes a reference sensor configured to acquire a reference signal correlated to noise within a vehicle cabin. In one example, the vehicle cabin may be the vehicle cabin 130 and the reference sensor may be the reference sensor 102 in FIG. 1. The VM noise cancellation system 200 includes a plurality of speakers 206 positioned within the vehicle cabin 130 configured to emit a noise cancellation signal to cancel noise around ears of one or more vehicle occupants, and a plurality of error microphones 208 positioned with the vehicle cabin 130 configured to acquire a residual signal. In one example, the plurality of speakers 206 and the plurality of error microphones 208 may respectively include some or all of the plurality of speakers 106 and the plurality of error microphones 108 of FIG. 1. The residual signal may comprise a filtered noise signal present within the vehicle cabin 130. For example, the physical microphone signal may comprise a residual signal that is the product of filtering road noise by the anti-noise signal produced by a transducer such as the speakers 206.

VM noise cancellation system 200 comprises an adaptive weight filter 204, which processes the reference signal obtained by the reference sensor 102 and applies an adaptive filtering algorithm to produce the noise cancellation signal. The adaptive weight filter 204 may be a time domain adaptive weight filter, which is dynamically adjusted based the disclosed TFSVM algorithm to reduce the residual signal.

The plurality of error microphones 208 positioned within the vehicle cabin 130 may be configured to estimate the acoustic environment near ears of a passenger regardless of the physical location or placement in the vehicle cabin 130. For example, a plurality of virtual microphones 208*a* may be modeled from the residual signal detected by a plurality of physical error microphones 208*b*. The plurality of physical error microphones 208*b* receive the residual signal, which is the resultant sound after the interaction of the emitted noise cancellation signal with the original noise is filtered with the adaptive weight filter 204. The residual signal provides feedback on the performance of the VM noise cancellation system 200.

The VM noise cancellation system 200 includes the signal processing unit 110 described above with reference to the vehicle noise cancelling system 100, the processor 112, and the non-transitory memory 114, which together execute machine-readable instructions for cancelling noise in the vicinity of the ears of the one or more vehicle occupants using the TFSVM algorithm. The signal processing unit 110 is in electronic communication with the reference sensor 102, the plurality of speakers 206, and the plurality of error microphones 208. In addition to executing the machine executable instructions described with reference to FIG. 1, the processor 112 may execute the TFSVM algorithm. The processor 112 processes data to adjust the adaptive weight filter 204 corresponding to the noise cancellation signal for targeted noise reduction near ears of passengers in the vehicle cabin 130.

A frequency domain filtered signal module 230 is included in the signal processing unit 110. The frequency domain filtered signal module 230 includes a frequency domain transform module 234, an overlap save module 232, and a plurality of secondary path filters 236. The frequency domain filtered signal module 230 transforms the reference signal, the noise cancellation signal, and the residual signal to the frequency domain using a Fast Fourier Transform (FFT) process, applying an overlap-save method to mitigate a wrap-around effect caused by circular correlation in the frequency domain. The plurality of secondary path filters 236 may include a frequency domain physical secondary path, a frequency domain virtual secondary path, and a frequency domain virtual path, which are calculated or measured in an offline or online process. For example, the plurality of secondary path filters 236 may be calculated based on a subband adaptive filtering process, or through other approaches. The output of the frequency domain filtered signal module 230 includes a frequency domain filtered virtual microphone signal and a frequency domain filtered reference.

A set of frequency domain subband filters 216 in the signal processing unit 110 of the VM noise cancellation system 200 is used in the decomposition of the frequency domain filtered virtual microphone signal and the frequency domain filtered reference signal into multiple subbands. Similar to the subband filters 116 described above with reference to the vehicle noise cancelling system 100, the frequency domain subband filters 216 are designed to divide the broad frequency range of the frequency domain filtered virtual microphone signal and the frequency domain filtered reference into narrower frequency bands. Each subband filter within the set corresponds to a distinct frequency range within a vehicle cabin noise spectrum. The design of the frequency domain subband filters 216 includes a plurality of subband filters derived from a prototype filter, generally a lowpass filter with a particular window function. The window function in the prototype filter design may be adjusted based on the application condition. The selection of the window function, such as Hamming or Kaiser, may depend on a predetermined frequency response characteristic for each subband. The prototype filter is then modulated to create a series of bandpass filters that span the entire frequency range of interest. The frequency range of each subband filter is equal to $$\frac{f_s}{M},$$

$f_s$ is the system sampling rate and M is the number of subband.

As described above with reference to FIG. 1, the impulse response of each subband filter is obtained from the prototype filter, and the resolution and computational demands of the subband filtering process may be adjusted by adjusting the length and number of subband filters. The frequency domain subband filters 216 are used on the frequency domain filtered virtual microphone signal and the frequency domain filtered reference through filter bank analysis, as introduced above and described in more detail with reference to FIG. 4. The outputs are a plurality of frequency domain subband signals, which include the frequency content of the original signals within each subband. In this way, the time domain adaptive filter is updated in each subband across the frequency range. Such an approach reduces the computational demands compared to full-band processing and achieves more noise reduction in the broadband frequency range.

An adaptive step size normalization module 220 is included in the signal processing unit 110. The adaptive step size normalization module 220 adjusts the step size in the frequency domain on a per subband basis. The adjustment affects the convergence rate and stability of the filter weights as the adaptive weight filter 204 is updated and adapted to the vehicle noise environment. The step size normalization module 220 dynamically modifies the step size in each subband based on the power contribution of the estimated virtual microphone signals and the reference signals within each respective subband, in similar approach as the adaptive step size determination module 120 in FIG. 1, and described in more detail below with reference to FIG. 4. The resulting normalized step size is implemented for weight transformation of each frequency domain subband adaptive filter to update the full length adaptive weight filter.

A gradient determination module 222 calculates a frequency domain subband gradient for each subband based on the frequency domain subband filtered reference signals and the corresponding frequency domain subband filtered error signals. The output of the gradient determination module 222 is used for adjusting the frequency domain subband adaptive filter in each subband to minimize the residual signal.

A subband adaptive weight update module 224 updates the frequency domain subband adaptive filter in each subband based on the calculated gradients and the normalized step sizes. The subband adaptive weight update module 224 adapts the virtual microphone noise cancellation system 200 to the real-time noise conditions within the vehicle cabin 130.

A weight transformation module 226 integrates the updated frequency domain subband adaptive filters from each subband. The weight transformation module transfers frequency domain subband adaptive filters to the obtain the full length adaptive weight filter in the time domain using an Inverse Fast Fourier Transform.

FIG. 3 shows plots 300, 310, 320, 330, 340, 350, 360, and 370 depicting simulation results of a performance comparison between a conventional virtual microphone algorithm and the disclosed TFSVM algorithm to reduce noise at a plurality of virtual microphone locations. In each plot, frequency in Hz is plotted on the x-axis and sound pressure level (SPL) in dB (A) is plotted on the y-axis. Plot 300 shows a first unfiltered noise signal 302 on a first virtual microphone, a first filtered signal 304 filtered by the conventional algorithm, and a first TFSVM-filtered signal 306 filtered by the disclosed TFSVM algorithm. Plot 310 shows a second unfiltered noise signal 312 on a second virtual microphone, a second filtered signal 314 filtered by the conventional algorithm, and a second TFSVM-filtered signal 316 filtered by the disclosed TFSVM algorithm. Plot 320 shows a third unfiltered noise signal 322 on a third virtual microphone, a third filtered signal 324 filtered by the conventional algorithm, and a third TFSVM-filtered signal 326 filtered by the disclosed TFSVM algorithm. Plot 330 shows a fourth unfiltered noise signal 332 on a fourth virtual microphone, a fourth filtered signal 334 filtered by the conventional algorithm, and a fourth TFSVM-filtered signal 336 filtered by the disclosed TFSVM algorithm. Plot 340 shows a fifth unfiltered noise signal 342 on a fifth virtual microphone, a fifth filtered signal 344 filtered by the conventional algorithm, and a fifth TFSVM-filtered signal 346 filtered by the disclosed TFSVM algorithm. Plot 350 shows a sixth unfiltered noise signal 352 on a sixth virtual microphone, a sixth filtered signal 354 filtered by the conventional algorithm, and a sixth TFSVM-filtered signal 356 filtered by the disclosed TFSVM algorithm. Plot 360 shows a seventh unfiltered noise signal 362 on a seventh virtual microphone, a seventh filtered signal 364 filtered by the conventional algorithm, and a seventh TFSVM-filtered signal 366 filtered by the disclosed TFSVM algorithm. Plot 370 shows an eighth unfiltered noise signal 372 on an eighth virtual microphone, an eighth filtered signal 374 filtered by the conventional algorithm, and an eighth TFSVM-filtered signal 376 filtered by the disclosed TFSVM algorithm.

To enhance the overall performance and reliability of a noise cancellation system and virtual microphone technology performance, the greater reduction from the unfiltered noise signal to the filtered noise signal, the better performance the system achieves. As shown in the plots 300, 310, 320, 330, 340, 350, 360, and 370, the overall reduction of road noise resulting from TFSVM filtering of the unfiltered noise signal (e.g., TFSVM-filtered signals 306, 316, 326, 336, etc.) is greater than the reduction of road noise resulting from the conventional VM filtering approach. This is especially noticeable in the high-frequency range with an overall increase of 1.4 dB (above 290 Hz) reduction at the virtual microphone positions. In other words, the TFSVM algorithm reduces more road noise near the ears of the vehicle occupants than the conventional approach. The TFSVM algorithm achieves this improved performance while also bringing down computational cost, relative to the traditional time-frequency Filtered-X Least Mean Square (FXLMS) algorithm.

FIG. 4 is a block diagram illustrating a Time Frequency Subband Virtual Microphone (TFSVM) system 400. The TFSVM system 400 is based on a time frequency domain subband adaptive filter structure which calculates estimated virtual microphone signals in each subband and individually updates an adaptive filter on each frequency range. The TFSVM system 400 may be the same or similar to the VM noise cancellation system 200 described with reference to FIG. 2. In one example, the TFSVM system 400 may be implemented in a noise cancelling system of a vehicle, such as the vehicle noise cancelling system 100 described with reference to FIG. 1. In one example, the TFSVM system 400 may be used in a Multiple Input Multiple Output (MIMO) system for noise cancelling in a vehicle. Signal paths are depicted in the diagram by a line with an arrow indicating a direction of signal transfer.

The TFSVM system 400 includes a reference sensor 402 sensor configured to acquire a reference signal correlated to noise within a vehicle cabin, a plurality of speakers 406 positioned within a vehicle cabin 404 configured to emit a noise cancellation signal to cancel noise around ears of one or more vehicle occupants, and a plurality of physical error microphones 408 positioned with the vehicle cabin 404 configured to acquire a residual signal resulting from filtering the reference signal with a time domain adaptive weight filter 401. The time domain adaptive weight filter 401 comprises a full length adaptive filter in the time domain that is dynamically adjusted to the reduce residual signal at a plurality of estimated virtual microphone locations within the vehicle cabin. The noise cancellation signal and the residual signal are also referred to herein respectively as a speaker out signal and a physical microphone signal.

To obtain the residual physical error microphone signal $e_{p,j}$(n) at block 409, it is expressed as:

$$e_{p,g}(n) = d_g(n) - \sum_{k=1}^{spk}\sum_{l=0}^{l_w-1} S_{p,gk}(l) * y_k(n-l)$$

$$y_k(n) = \sum_{k=1}^{spk}\sum_{i=1}^{acc}\sum_{l=0}^{l_w-1} w_{ki}(n) * r_i(n-l)$$

where $e_{p,g}$(n) is the residual physical microphone signal on the $g^{th}$ physical error microphone, $d_g$(n) is the primary signal on the $g^{th}$ error physical microphone, $S_{p,gk}$ is the real acoustic impulse response of secondary path from the $k^{th}$ speaker to the $g^{th}$ physical error microphone, $r_i$(n) is the $i^{th}$ reference signal, $w_{ki}$(n) is the full length adaptive filter, $l_w$ is the length of the adaptive filter, and * is the linear convolution operator. In other words, the residual signal is obtained by linear convolution of the primary signal on the plurality of physical error microphones, the real impulse response from the plurality of speakers to the plurality of physical error microphones, and the full length adaptive filter.

Conventionally, time domain VM approaches process an estimated error microphone signal $$e_v'(n)$$

process in the time domain, which demands substantial computation cost. Alternatively, the TFSVM system 400 calculates an estimated virtual microphone signal $$e_v'(n)$$

using a Fast Fourier Transform (FFT) process. To avoid the wrap-around effect of the circular correlation of the FFT process, an overlap save method is applied. Hence, the physical microphone signal block $e_{p,g}$ and speaker out block $y_k$ are expressed as follows, $$e_{p,g}(\kappa) = [0 \ldots 0 e_{p,g}(\kappa N) e_{p,g}(\kappa N + N - 1)]$$

$$y_k(\kappa) = [0 \ldots 0 y_k(\kappa N) y_k(\kappa N + N - 1)]$$

where $e_{p,g}(\kappa)$ is the 2N block vector of physical microphone signal on the $g^{th}$ physical microphone channel, $y_k(\kappa)$ is the 2N block vector of the speaker out signal on the $k^{th}$ speaker channel adding N zero blocks on the first N points, κ is the block index, N is the block size that is equal to the full length of the adaptive filter ($l_w$). In other words, the TFSVM system 400 may form a noise cancellation signal 2N block vector and a residual signal 2N block vector at blocks 410*a*, 410*b* by respectively adding N zero blocks to the speaker out signal and physical microphone signal.

Then, the physical microphone signal block vector $e_{p,g}$ and speaker out block vector $y_k$ are transformed into the frequency domain using FFT, which is computed as follows, $$E'_{p,g}(f) = FFT[e_{p,g}(\kappa)]$$

$$Y_k(f) = FFT[y_k(\kappa)]$$

where $E_{p,g}$(f) is the frequency domain physical microphone signal of the $g^{th}$ physical microphone channel, and $Y_k$(f) is the frequency domain speaker output signal of the $k^{th}$ speaker channel. In other words, the TFSVM system 400 applies FFT to the noise cancellation signal 2N block vector and the residual signal 2N block vector to respectively produce a frequency domain noise cancellation signal and a frequency domain residual signal at blocks 412*a*, 412*b*, wherein N is a block size equal to a full length of the time domain adaptive weight filter 401.

To further reduce the computational load, a frequency domain estimated physical secondary path $S'_{p,gk}$, a frequency domain estimated virtual secondary path $S'_{v,jk}$, and frequency domain estimated virtual path $S'_{pv,gj}$ are applied respectively at blocks 414*a*, 414*b*, 414*c*. In one example, the secondary path filters may be calculated or measured in online or offline process. For example, the secondary path filters may be calculated based on a subband adaptive filtering process, and in other examples, the secondary path filters may be calculated based on a head-related transfer function process. The secondary path filters are used to calculate the frequency domain filtered estimated virtual error microphone signal $E'_{v,j}$ at block 415. Corresponding secondary path filtering equations are as follows, $$E'_g(f) = E'_{p,g}(f) - S'_{p,gk}(f)Y_k(f)$$

$$E'_{v,j}(f) = S'_{pv,gj}(f)E'_g(f) - S'_{v,jk}(f)Y_k(f)$$

where $E'_g(f)$ is the frequency domain estimated error signal of the $g^{th}$ physical microphone channel, $E'_{v,j}(f)$ is the frequency domain estimated virtual error signal of the $j^{th}$ virtual microphone channel, $Y_k(f)$ is the frequency domain speaker output signal of the $k^{th}$ speaker channel, $S'_{p,gk}$ is the frequency domain secondary path from the $g^{th}$ physical error microphone to the $k^{th}$ speaker, $S'_{v,jk}$ is the frequency domain secondary path from the $v^{th}$ virtual error microphone to the $k^{th}$ speaker, and $S'_{pv,gj}$ is the frequency domain secondary path from the $p^{th}$ physical error microphone to the $v^{th}$ virtual error microphone.

Reference signal block $r_i$ at block 403 and related frequency domain reference signal at block 413 are expressed as follows, $$r_i(\kappa) = [r_i(\kappa N - N)\ \dots\ r_{i,m}(\kappa N - 1) r_{i,m}(\kappa N)\ \dots\ r_{i,m}(\kappa N + N - 1)]$$

$$R_i(f) = FFT[r_i(\kappa)]$$

where $r_i(\kappa)$ is the 2N block vector of reference signal on the $i^{th}$ reference channel, $R_i(f)$ is the frequency domain reference signal of the $i^{th}$ reference channel, κ is the block index, N is the block size that is equal to the full length of the adaptive filter ($l_w$). In other words, the TFSVM system 400 may form a reference signal 2N block vector at block 410*c* from the reference signal at block 403 and applies FFT to the reference signal 2N block vector at block 412*c* to produce to the frequency domain reference signal at block 413, wherein N is a block size equal to a full length of the time domain adaptive weight filter 401.

The frequency domain reference signal at block 413 is input to the following calculation to produce a frequency domain filtered reference signal, $$R'_{ijk}(f) = S'_{v,jk}(f)R_i(f)$$

where $R'_{ijk}(f)$ is the frequency domain filtered reference signal of the $i^{th}$ reference channel, $j^{th}$ virtual microphone channel, and $k^{th}$ speaker channel. $S'_{v,jk}$ is the frequency domain estimated virtual secondary path from the $j^{th}$ virtual error microphone to the $k^{th}$ speaker. In other words, the TFSVM system 400 may apply a frequency domain virtual secondary path filter at block 414*d* to the frequency domain reference signal to produce to the frequency domain filtered reference signal at block 417.

To reduce the complexity of the VM adaptive filtering process, a new frequency domain subband process, which directly processes the signal from full band frequency domain to subband frequency domain, is applied. To break down or partition the input signals into individual frequency domain subbands, a set of frequency domain subband analysis filters are used, where each subband represents a different frequency range. In one example, the set of frequency domain subband analysis filters comprises frequency domain filter bank 416. The frequency domain subband reference signals are calculated as follows, $$R'_{ijk} = [0_{4lw/M}, R'_{ijk}, 0_{4lw/M}]$$

$$R'_{ijk,m}(f) = R'_{ijk}\left(f_{\frac{2ml_W}{M}+1:\frac{2(m+1)l_W}{M}}\right)$$

$$E'_j = [0_{4lw/M}, E'_j, 0_{4lw/M}]$$

$$E'_{j,m}(f) = E'_j\left(f_{\frac{2ml_W}{M}+1:\frac{2(m+1)l_W}{M}}\right)$$

$$l_{sW} = \frac{2l_w}{M}$$

where $R'_{ijk,m}(f)$ is the frequency domain $m^{th}$ subband reference signal of the $i^{th}$ reference channel, $j^{th}$ virtual microphone channel, and $k^{th}$ speaker channel. $E_{j,m}(f)$ is the frequency domain $m^{th}$ subband error signal of the $j^{th}$ virtual error microphone channel, $0_{4lw/M}$ is the zero block vector that includes 4lw/M zeros, $l_w$ is the length of the adaptive filter, $L_{sW}$ is the length of the subband adaptive filter, M is the number of subbands. In other words, the TFSVM system 400 may decompose the frequency domain filtered virtual microphone signal at block 415 and the frequency domain filtered reference signal at block 417 respectively into a plurality of frequency domain subband signals comprising a plurality of frequency domain subband filtered reference signals and a plurality of frequency domain filtered estimated virtual microphone signals.

Further, based on the frequency domain subband filtered reference signal $R'_{ijk,m}$ and frequency domain subband error signal $E_{j,m}$, the frequency domain subband gradient $G_{ki,m}$ is expressed as follows, $$G_{ki,m}(f) = R^{*\prime}_{jki,m}(f)E_{j,m}(f)$$

where $G_{ki,m}(f)$ is the frequency domain $m^{th}$ subband gradient on the $i^{th}$ reference channel and $k^{th}$ speaker channel, $R'_{jki,m}(\kappa)$ is the complex conjugate of the frequency domain $m^{th}$ subband filtered reference signal on the $i^{th}$ reference channel, $j^{th}$ virtual error microphone channel, and $k^{th}$ speaker channel. In other words, the frequency domain subband gradient calculation, indicated by blocks 418*a*, 418*b*, 418*c*, includes performing a complex conjugate multiplication of the frequency domain subband filtered reference signal and the frequency domain subband error signal. The frequency domain subband adaptive filter in each subband is adjusted based on each frequency domain subband gradient calculation, which is a part of a subband LMS process.

To adjust the frequency domain subband adaptive filter convergence speed and enhance performance of the disclosed TFSVM process, frequency domain subband flexible adaptive step size normalization is proposed, which is based on a power contribution of the error microphone and reference signals to adjust the step size. A subband flexible adaptive normalized step size $U_{ki,m}$ in the frequency domain is calculated by the following equation, $$P_{ki,m}(\kappa) = \gamma_m P_{ki,m}(\kappa - 1) + (1-\gamma_m)\left[\sum_{j=1}^{mic}\sum_{f=1}^{f=l_{sW}} R'_{jki,m}(f)R^{*\prime}_{jki,m}(f) + \alpha_m * \sum_{j=1}^{mic}\sum_{f=1}^{f=l_{sW}} E_{j,m}(f)E^{*\prime}_{j,m}(f)\right]$$

$$U_{ki,m}(\kappa) = \frac{\mu}{P_{ki,m}(\kappa) + \epsilon_m * \mathrm{Max}(P_{ki,m}(\kappa))}$$

where $P_{ki,m}(\kappa)$ is the sum power for filtered reference and error signals of the $m^{th}$ subband, $U_{ki,m}(\kappa)$ is the $i^{th}$ reference channel and $k^{th}$ speaker channel normalized step size in the $m^{th}$ subband filter, $R'_{jki,m}(f)$ is the frequency domain $m^{th}$ subband filtered reference signal of the $i^{th}$ reference channel, $j^{th}$ virtual microphone channel, and $k^{th}$ speaker channel, $\alpha_m$ is the sum power contribution of the error signal, $\gamma_m$ is the smoothing parameter of power of filter reference and error signals, $\epsilon_m$ is the power contribution parameter of max power of filter reference and error signals on each subband. The frequency domain subband flexible adaptive step size normalization process ensures different subband signal levels converge at a uniform rate.

The frequency domain subband adaptive filter weight $W_{ki,m}$ is calculated and updated as per the following equation, which is based on the frequency domain subband gradient $G_{ki,m}$ and frequency domain normalized step size $U_{ki,m}$, $$W_{ki,m}(\kappa + 1) = \gamma_m W_{ki,m}(\kappa) + U_{ki,m}(\kappa)G_{ki,m}(\kappa)$$

where $W_{ki,m}(\kappa)$ is the frequency domain $m^{th}$ subband adaptive filter of the $i^{th}$ reference channel and $k^{th}$ speaker channel, $U_{ki,m}(\kappa)$ is the frequency domain $m^{th}$ subband normalized step size of the $i^{th}$ reference channel and $k^{th}$ speaker channel, and $\gamma_m$ is the leakage of the $m^{th}$ subband. In other words, the TFSVM system 400 may update a set of frequency domain subband adaptive filter weights, indicated by blocks 420*a*, 420*b*, 420*c*, based on the frequency domain subband gradient and the frequency domain normalized step size to produce an updated set of frequency domain subband adaptive filter weights.

To obtain the full length adaptive filter $w_{ki}$ in the time domain, a subband weight transformation process is implemented at block 422, which transfers frequency domain subband adaptive filters $W_{ki,m}$ to time domain full length adaptive filters $w_{ki}$.

$$W_{ki}\left(f_{2ml_{sW}+1:2(m+1)l_{sW}}\right) = W_{ki,m}$$

$$W'_{ki}(f) = W_{ki}(l_W - f)^*$$

$$w_{ki} = IFFT\left(\text{drop the first and last of } \frac{4lw}{M} \text{ vector in the } [W_{ki}, W'_{ki}]\right)$$

$$w_{ki} = w_{ki}\left(1{:}\ l_W\right)$$

where $W_{ki}$ is the frequency domain full band adaptive filter of the $i^{th}$ reference channel and the $k^{th}$ speaker output channel, $W'_{ki}$ is the complex conjugate of the flipped $W_{ki}$ of the frequency domain, $w_{ki}$ is the time domain FIR filter of the $i^{th}$ reference channel and $k^{th}$ speaker channel, $l_{sW}$ is the length of the subband filter, $l_w$ is the length of the full adaptive filter, and ( )* is the complex conjugate. In other words, the TFSVM system 400 transforms the updated set of frequency domain subband adaptive filter weights from a frequency domain to a time domain using an Inverse Fast Fourier Transform (IFFT) at block 424 to produce an updated time domain adaptive weight filter. As part of the overlap save method noted above, to update the time domain adaptive weight filter based on the weighted transformation of the plurality of frequency domain subband adaptive filters, the TFSVM system 400 is further configured to drop a last N zero block, as indicate by block 426, from the output of the weighted transformation of the plurality of frequency domain subband adaptive filters. As part of the overlap save method, dropping the last N zero block restores the signal to the original adaptive filter length. The VM noise cancellation system then emits the noise cancellation signal based on the updated time domain adaptive weight filter to reduce noise around the ears of the one or more vehicle occupants.

FIG. 5A, FIG. 5B, and FIG. 5C are flow charts depicting a method 500 for active noise cancellation incorporating the disclosed TFSVM algorithm. The method 500 may be similar to the approach described with reference to the VM noise cancellation system 200 that may be included in the vehicle noise cancelling system 100, respectively described in FIG. 2 and FIG. 1. Instructions for carrying out the method 500 may be executed by a controller based on computer readable instructions stored on a memory of the controller and in conjunction with signals received from sensors of the vehicle system, such as the signal processing unit 110, the processor 112, the non-transitory memory 114, the reference sensor 102, the plurality of error microphones 208, and the set of frequency domain subband filters 216 described above with reference to FIG. 1 and FIG. 2. The controller may employ actuators of the vehicle system, such as the plurality of speakers 206, to adjust vehicle system operation, according to the methods described below.

At 502, the method 500 includes acquiring a reference signal from the reference sensor. In one example, the reference signal corresponds to noise within the vehicle cabin. There may be one or more reference sensors placed within the cabin of the vehicle that are capable of detecting the noise in the cabin of the vehicle.

At 504, the method 500 includes processing the reference signal with a time domain adaptive weight filter to produce a noise cancellation signal. The noise cancellation signal (also called a speaker out signal) may be emitted by the plurality of speakers or transducers within the vehicle cabin in an attempt to cancel (e.g., reduce) sound near the ears of the one or more vehicle occupants within the vehicle cabin. The characteristics of the time domain adaptive weight filter may be iteratively updated to minimize a residual signal detected at the plurality of physical microphones, which is used for estimating noise at a plurality of virtual microphone locations. The residual signal may include ambient noise which remains after active noise cancellation has been performed on the reference signal using the time domain adaptive weight filter.

At 506, the method 500 includes estimating a frequency domain filtered virtual microphone (VM) signal as further detailed at FIG. 5B of the method 500. Thus, looking to FIG. 5B, step 506 of the method 500 includes receiving a noise cancellation signal and a residual physical error microphone signal, or residual signal, at 550.

At 552, the method 500 includes applying an overlap save method to the noise cancellation signal and the residual signal. One example of applying the overlap save method may include forming a noise cancellation signal 2N block vector and a residual signal 2N block vector by respectively adding N zero blocks to the noise cancellation signal and the residual signal, wherein N is a block size equal to a full length of the time domain adaptive weight filter At 554, the method 500 includes applying a Fast Fourier Transform to the noise cancellation signal 2N block vector and the residual signal 2N block vector. Transforming the noise cancellation signal 2N block vector and the residual signal 2N block vector respectively produces a frequency domain (FD) noise cancellation signal and a frequency domain residual signal.

At 556, the method 500 includes applying a plurality of secondary path filters to the frequency domain noise cancellation signal and the frequency domain residual signal to calculate the frequency domain estimated virtual error microphone signal. The plurality of secondary path filters may include a frequency domain estimated physical secondary path, representing the frequency domain secondary path from the plurality of physical error microphones to the speaker. The frequency domain estimated physical secondary path may be used to calculate a frequency domain estimated error signal from the frequency domain noise cancellation signal and the frequency domain physical microphone signal. The plurality of secondary path filters further include a frequency domain estimated virtual secondary path, representing the frequency domain secondary path from the plurality of virtual error microphones to the plurality of speakers, and a frequency domain estimated virtual path, representing the frequency domain secondary path from the plurality of physical error microphones to the plurality of virtual error microphones. The frequency domain estimated virtual secondary path filter and the frequency domain estimated virtual path filter are used to calculate the frequency domain estimated virtual error microphone signal from the frequency domain estimated error signal and the frequency domain noise cancellation signal.

Following step 556, the flow chart at FIG. 5B returns FIG. 5A at step 508.

At 508, the method 500 includes determining a frequency domain filtered reference signal as further detailed at FIG. 5C of the method 500. Thus, looking to FIG. 5C, step 508 of the method 500 includes receiving a reference sensor signal at 560.

At 562, the method 500 includes applying the overlap save method to the reference sensor signal. The overlap save method may include forming a reference signal 2N block vector from the reference signal, wherein N is a block size equal to a full length of the time domain adaptive weight filter.

At 564, the method 500 includes applying a FFT process to the reference signal 2N block vector. Transforming the reference signal 2N block vector produces a frequency domain reference signal.

At 566, the method 500 includes applying the frequency domain estimated virtual secondary path filter to the frequency domain reference signal. As described above with reference to FIG. 5B, the frequency domain estimated virtual secondary path represents the frequency domain secondary path from the plurality of virtual error microphones to the plurality of speakers. The frequency domain estimated virtual secondary path filter is used to calculate the frequency domain filtered reference signal from the frequency domain reference signal.

Following step 556, the flow chart at FIG. 5C may return to FIG. 5A at step 510.

At 510, the method 500 includes applying a set of frequency domain subband filters to decompose the frequency domain filtered reference signal, a full bandwidth signal, into a plurality of frequency domain subband filtered reference signals. As described above, the frequency domain subband analysis filters separate the full band frequency domain filtered reference signal into separate subbands based on frequency. In some examples low pass and high pass filters may be used to decompose the full band frequency domain filtered reference signal into a plurality of frequency domain subband signals. Separating the full band frequency domain filtered reference signal into the plurality of frequency domain subband signals allows an error signal to be associated with each subband.

At 512, the method 500 includes applying the set of frequency domain subband filters to decompose the frequency domain filtered estimated virtual microphone signal, a full bandwidth signal, into a plurality of frequency domain filtered estimated virtual microphone signals. The frequency domain subband filters separate the frequency domain filtered estimated virtual microphone signal into the same frequency subbands that the frequency domain filtered reference signal is separated into, and the separation may similarly be accomplished by high pass and low pass filters. Using the same frequency subbands at 510 ensures that each subband reference signal has a corresponding subband error signal.

At 514, a process is applied to each subband individually from the other subbands to determine a frequency domain subband adaptive filter for each individual subband. The sub-methods within 514 are applied to each subband created by the frequency domain subband adaptive filter at 510 and 512 before the method continues past 514.

Within 514, at 516, the method 500 includes determining a frequency domain subband gradient based on a frequency domain subband filtered reference signal and a frequency domain subband error signal that share the same subband. The subband gradient provides information on how the weights of the frequency domain adaptive weight filter can be adjusted to reduce the subband signal error.

At 518, the method 500 includes determining a frequency domain normalized step size. The normalized step size may be adjusted from a previously determined step size based on a power contribution of the frequency domain subband filtered reference signal and the frequency domain error signal. The frequency domain normalized step size may influence the convergence rate and stability of the frequency domain adaptive filter weights and it may be advantageous to balance the normalized step size so that the adaptive filter weights converge quickly but do not change too drastically between each update.

At 520, the method 500 includes determining a frequency domain adaptive filter weight based on the normalized step size and the gradient. The frequency domain adaptive filter weight may be updated according to the methods described with respect to FIG. 4 and may depend on the previous iteration of the frequency domain adaptive filter weight, the frequency domain subband gradient, the frequency domain normalized step size and the leakage of the frequency domain subband adaptive filter. The leakage of the subband may represent the degree to which the previous iteration of the frequency domain subband adaptive filter influences the updated frequency domain subband adaptive filter to reduce the road noise effect.

At 522, the method 500 includes applying a subband weight transformation to each frequency domain subband adaptive filter. The subband weight transformation process integrates the updated adaptive filter weights from each subband to produce the final weights for the adaptive weight filter in the time domain. The subband weight transformation process may be applied according to the methods described with respect to FIG. 4 and may include transforming each frequency domain subband adaptive filter into the time domain using an Inverse Fast Fourier Transform and dropping the last N Zero block from the transformed filters as part of the overlap save method.

At 524, the method further includes updating the weights of the adaptive weight filter based on the weight transformed subband adaptive filters. The weights may be updated to minimize the residual signal detected at the plurality of physical error microphones and estimated at the plurality virtual microphone locations.

In this way, by calculating the estimated virtual microphone signal in each subband, and individually updating the adaptive filter on each frequency range, the systems and methods disclosed herein implementing the TFSVM algorithm achieve more noise reduction in the broadband frequency range compared to the traditional Filtered-X Least Mean Square algorithm or the time-frequency FXLMS algorithm. Further, as disclosed, the method of subband flexible adaptation step size normalization increases the performance and convergence speed of the proposed TFSVM algorithm. The technical effect of the present application is enhanced virtual microphone technology performance with less computational resource demand.

The disclosure also provides support for a method for noise cancellation in a vehicle having a reference sensor configured to acquire a reference signal correlated to noise within a vehicle cabin, a plurality of speakers positioned within the vehicle cabin configured to emit a noise cancellation signal to cancel noise around ears of one or more vehicle occupants, and a plurality of physical error microphones positioned with the vehicle cabin configured to acquire a residual signal, the method comprising: processing the reference signal with a time domain adaptive weight filter to produce the noise cancellation signal, estimating a frequency domain filtered virtual microphone signal from the noise cancellation signal and the residual signal, and a frequency domain filtered reference signal from the reference signal, decomposing the frequency domain filtered virtual microphone signal and the frequency domain filtered reference signal into a plurality of frequency domain subband signals, calculating a frequency domain subband adaptive filter for each subband of the plurality of frequency domain subband signals to produce a plurality of frequency domain subband adaptive filters, and updating the time domain adaptive weight filter based on a weight transformation of the plurality of frequency domain subband adaptive filters to produce an updated time domain adaptive weight filter. In a first example of the method, the method further comprises: applying the updated time domain adaptive weight filter to cancel noise in the vehicle. In a second example of the method, optionally including the first example, estimating the frequency domain filtered virtual microphone signal from the noise cancellation signal and the residual signal comprises transforming the noise cancellation signal and the residual signal respectively into a frequency domain noise cancellation signal and a frequency domain residual signal using a Fast Fourier Transform (FFT). In a third example of the method, optionally including one or both of the first and second examples, transforming the noise cancellation signal and the residual signal into the frequency domain noise cancellation signal and the frequency domain residual signal further comprises: forming a noise cancellation signal 2N block vector and a residual signal 2N block vector by respectively adding N zero blocks to the noise cancellation signal and the residual signal, and applying the FFT to the noise cancellation signal 2N block vector and the residual signal 2N block vector, wherein N is a block size equal to a full length of the time domain adaptive weight filter. In a fourth example of the method, optionally including one or more or each of the first through third examples, estimating the frequency domain filtered virtual microphone signal from the noise cancellation signal and the residual signal further comprises applying a plurality of secondary path filters to the frequency domain noise cancellation signal and the frequency domain residual signal, wherein the plurality of secondary path filters comprises a frequency domain physical secondary path, a frequency domain virtual secondary path, and a frequency domain virtual path. In a fifth example of the method, optionally including one or more or each of the first through fourth examples, estimating the frequency domain filtered reference signal from the reference signal comprises: forming a reference signal 2N block vector from the reference signal, applying a Fast Fourier Transform to the reference signal 2N block vector to produce a frequency domain reference signal, wherein N is a block size equal to a full length of the time domain adaptive weight filter, and applying a frequency domain virtual secondary path filter to the frequency domain reference signal. In a sixth example of the method, optionally including one or more or each of the first through fifth examples, decomposing the frequency domain filtered virtual microphone signal and the frequency domain filtered reference signal into the plurality of frequency domain subband signals comprises filtering the frequency domain filtered virtual microphone signal and the frequency domain filtered reference signal through a frequency domain filter bank comprising a set of frequency domain subband filters, each subband filter corresponding to a distinct frequency range within a vehicle cabin noise spectrum. In a seventh example of the method, optionally including one or more or each of the first through sixth examples, calculating the frequency domain subband adaptive filter for each subband of the plurality of frequency domain subband signals comprises determining a frequency domain subband gradient for each subband based on a frequency domain subband filtered reference signal and a frequency domain subband error signal, and determining a frequency domain normalized step size for each subband based on a power contribution of the frequency domain subband filtered reference signal and the frequency domain subband error signal. In a eighth example of the method, optionally including one or more or each of the first through seventh examples, determining the frequency domain subband gradient for each subband comprises performing a complex conjugate multiplication of the frequency domain subband filtered reference signal and the frequency domain subband error signal. In a ninth example of the method, optionally including one or more or each of the first through eighth examples, the weight transformation comprises updating a set of frequency domain subband adaptive filter weights based on the frequency domain subband gradient and the frequency domain normalized step size to produce an updated set of frequency domain subband adaptive filter weights, and transforming the updated set of frequency domain subband adaptive filter weights from a frequency domain to a time domain using Inverse Fast Fourier Transform to produce the updated time domain adaptive weight filter.

The disclosure also provides support for a noise cancellation system for a vehicle comprising: a reference sensor configured to acquire a reference signal correlated to noise within a vehicle cabin, a time domain adaptive weight filter in electronic communication with the reference sensor, configured to apply an adaptive filtering process to the reference signal to produce a noise cancellation signal to cancel noise around ears of one or more vehicle occupants, a plurality of speakers positioned within the vehicle cabin and in electronic communication with the time domain adaptive weight filter, configured to emit the noise cancellation signal into the vehicle cabin, a plurality of physical error microphones positioned within the vehicle cabin and configured to acquire a residual signal resulting from interaction of the noise cancellation signal and the noise within the vehicle cabin, and a signal processing unit in electronic communication with the reference sensor, the plurality of speakers, and the plurality of physical error microphones, wherein the signal processing unit comprises: a non-transitory memory storing a set of frequency domain subband filters, and instructions, and a processor, wherein, when executing the instructions, the processor is configured to: estimate a frequency domain filtered virtual microphone signal from the noise cancellation signal and a residual physical error microphone signal, and a frequency domain filtered reference signal from the reference signal, decompose the frequency domain filtered virtual microphone signal and the frequency domain filtered reference signal into a plurality of frequency domain subband signals, calculate a frequency domain subband adaptive filter for each subband of the plurality of frequency domain subband signals to produce a plurality of frequency domain subband adaptive filters, and update the time domain adaptive weight filter based on a weighted transformation of the plurality of frequency domain subband adaptive filters. In a first example of the system, to estimate the frequency domain filtered virtual microphone signal from the noise cancellation signal and the residual signal, the processor is further configured to: form a noise cancellation signal 2N block vector and a residual signal 2N block vector by respectively adding N zero blocks to the noise cancellation signal and the residual signal, apply a Fast Fourier Transform (FFT) to the noise cancellation signal 2N block vector and the residual signal 2N block vector to produce a frequency domain noise cancellation signal and a frequency domain residual signal, wherein N is a block size equal to a full length of the time domain adaptive weight filter, and apply a plurality of secondary path filters to the frequency domain noise cancellation signal and the frequency domain residual signal. In a second example of the system, optionally including the first example, to estimate the frequency domain filtered reference signal from the reference signal, the processor is further configured to: form a reference signal 2N block vector from the reference signal, apply the FFT to the reference signal 2N block vector to produce a frequency domain reference signal, wherein N is the block size equal to the full length of the time domain adaptive weight filter, and apply a frequency domain estimated virtual secondary path filter to the frequency domain reference signal. In a third example of the system, optionally including one or both of the first and second examples, to update the time domain adaptive weight filter based on the weighted transformation of the plurality of frequency domain subband adaptive filters, the processor is further configured to drop a last N zero block from an output of the weighted transformation of the plurality of frequency domain subband adaptive filters. In a fourth example of the system, optionally including one or more or each of the first through third examples, the set of frequency domain subband filters comprise a plurality of subband filters derived from a prototype filter using high pass and low pass filters, each subband filter corresponding to a distinct frequency range within a vehicle cabin noise spectrum. In a fifth example of the system, optionally including one or more or each of the first through fourth examples, the noise cancellation system is a multiple input multiple output active noise cancellation system.

The disclosure also provides support for a method for noise cancellation in a vehicle comprising: acquiring a reference signal using a reference sensor, wherein the reference signal is correlated with noise in a vehicle cabin, processing the reference signal with a time domain adaptive weight filter to produce a noise cancellation signal, emitting the noise cancellation signal to cancel noise around ears of one or more vehicle occupants using a plurality of speakers positioned in the vehicle cabin, acquiring a residual signal from a plurality of physical error microphones positioned in the vehicle cabin, transforming the noise cancellation signal, the residual signal, and the reference signal into a frequency domain noise cancellation signal, a frequency domain residual signal, and a frequency domain reference signal, respectively, using a Fast Fourier Transform (FFT), applying a plurality of secondary path filters to the frequency domain noise cancellation signal and the frequency domain residual signal to produce a frequency domain filtered estimated virtual microphone signal, and to the frequency domain reference signal to produce a frequency domain filtered reference signal, applying a set of frequency domain subband filters to decompose the frequency domain filtered reference signal and the frequency domain filtered estimated virtual microphone signal respectively into a plurality of frequency domain subband filtered reference signals and a plurality of frequency domain filtered estimated virtual microphone signals, determining a frequency domain subband gradient for each subband based on a frequency domain subband reference signal and a frequency domain subband error signal, determining a frequency domain normalized step size for each subband based on a power contribution of the frequency domain subband reference signal and the frequency domain subband error signal, updating a set of frequency domain subband adaptive filter weights based on the frequency domain subband gradient and the frequency domain normalized step size to produce an updated set of frequency domain subband adaptive filter weights, transforming the updated set of frequency domain subband adaptive filter weights from a frequency domain to a time domain using Inverse Fast Fourier Transform to produce an updated time domain adaptive weight filter, and emitting the noise cancellation signal based on the updated time domain adaptive weight filter to reduce noise around the ears of the one or more vehicle occupants. In a first example of the method, transforming the noise cancellation signal, the residual signal, and the reference signal into the frequency domain noise cancellation signal, the frequency domain residual signal, and the frequency domain reference signal, respectively, using FFT, further comprises applying an overlap-save method to mitigate a wrap-around effect caused by circular correlation in the frequency domain. In a second example of the method, optionally including the first example, applying the overlap-save method comprises forming a noise cancellation signal 2N block vector and a residual signal 2N block vector by respectively adding N zero blocks to the noise cancellation signal and the residual signal, forming a reference signal 2N block vector, transforming the noise cancellation signal 2N block vector, the residual signal 2N block vector, and the reference signal 2N block vector to the frequency domain, and dropping a last N zero block from the updated time domain adaptive weight filter, wherein N is a block size equal to a full length of the time domain adaptive weight filter. In a third example of the method, optionally including one or both of the first and second examples, the plurality of secondary path filters comprises a frequency domain estimated physical secondary path, a frequency domain estimated virtual secondary path, and a frequency domain estimated virtual path.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the vehicle noise cancelling system 100 and the VM noise cancellation system 200, described with reference to FIG. 1 and FIG. 2, respectively. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. An individual step may be omitted in a particular embodiment. The described systems are exemplary in nature, and may include additional elements and/or omit elements. The subject matter of the present disclosure includes all novel and non-obvious combinations and sub-combinations of the various systems and configurations, and other features, functions, and/or properties disclosed. As used herein, "approximately" is construed to mean plus or minus five percent of the range unless otherwise specified.

As used in this application, an element or step recited in the singular and preceded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method for noise cancellation in a vehicle having a reference sensor configured to acquire a reference signal correlated to noise within a vehicle cabin, a plurality of speakers positioned within the vehicle cabin configured to emit a noise cancellation signal to cancel noise around ears of one or more vehicle occupants, and a plurality of physical error microphones positioned with the vehicle cabin configured to acquire a residual signal, the method comprising:

processing the reference signal with a time domain adaptive weight filter to produce the noise cancellation signal;

estimating a frequency domain filtered virtual microphone signal from the noise cancellation signal and the residual signal, and a frequency domain filtered reference signal from the reference signal;

decomposing the frequency domain filtered virtual microphone signal and the frequency domain filtered reference signal into a plurality of frequency domain subband signals;

calculating a frequency domain subband adaptive filter for each subband of the plurality of frequency domain subband signals to produce a plurality of frequency domain subband adaptive filters; and updating the time domain adaptive weight filter based on a weight transformation of the plurality of frequency domain subband adaptive filters to produce an updated time domain adaptive weight filter.

2. The method of claim 1, further comprising applying the updated time domain adaptive weight filter to cancel noise in the vehicle.

3. The method of claim 1, wherein estimating the frequency domain filtered virtual microphone signal from the noise cancellation signal and the residual signal comprises transforming the noise cancellation signal and the residual signal respectively into a frequency domain noise cancellation signal and a frequency domain residual signal using a Fast Fourier Transform (FFT).

4. The method of claim 3, wherein transforming the noise cancellation signal and the residual signal into the frequency domain noise cancellation signal and the frequency domain residual signal further comprises:

forming a noise cancellation signal 2N block vector and a residual signal 2N block vector by respectively adding N zero blocks to the noise cancellation signal and the residual signal; and applying the FFT to the noise cancellation signal 2N block vector and the residual signal 2N block vector, wherein N is a block size equal to a full length of the time domain adaptive weight filter.

5. The method of claim 3, wherein estimating the frequency domain filtered virtual microphone signal from the noise cancellation signal and the residual signal further comprises applying a plurality of secondary path filters to the frequency domain noise cancellation signal and the frequency domain residual signal, wherein the plurality of secondary path filters comprises a frequency domain physical secondary path, a frequency domain virtual secondary path, and a frequency domain virtual path.

6. The method of claim 1, wherein estimating the frequency domain filtered reference signal from the reference signal comprises:

forming a reference signal 2N block vector from the reference signal;

applying a Fast Fourier Transform to the reference signal 2N block vector to produce a frequency domain reference signal, wherein N is a block size equal to a full length of the time domain adaptive weight filter; and applying a frequency domain virtual secondary path filter to the frequency domain reference signal.

7. The method of claim 1, wherein decomposing the frequency domain filtered virtual microphone signal and the frequency domain filtered reference signal into the plurality of frequency domain subband signals comprises filtering the frequency domain filtered virtual microphone signal and the frequency domain filtered reference signal through a frequency domain filter bank comprising a set of frequency domain subband filters, each subband filter corresponding to a distinct frequency range within a vehicle cabin noise spectrum.

8. The method of claim 1, wherein calculating the frequency domain subband adaptive filter for each subband of the plurality of frequency domain subband signals comprises determining a frequency domain subband gradient for each subband based on a frequency domain subband filtered reference signal and a frequency domain subband error signal, and determining a frequency domain normalized step size for each subband based on a power contribution of the frequency domain subband filtered reference signal and the frequency domain subband error signal.

9. The method of claim 8, wherein determining the frequency domain subband gradient for each subband comprises performing a complex conjugate multiplication of the frequency domain subband filtered reference signal and the frequency domain subband error signal.

10. The method of claim 8, wherein the weight transformation comprises updating a set of frequency domain subband adaptive filter weights based on the frequency domain subband gradient and the frequency domain normalized step size to produce an updated set of frequency domain subband adaptive filter weights, and transforming the updated set of frequency domain subband adaptive filter weights from a frequency domain to a time domain using Inverse Fast Fourier Transform to produce the updated time domain adaptive weight filter.

11. A noise cancellation system for a vehicle comprising:

a reference sensor configured to acquire a reference signal correlated to noise within a vehicle cabin;

a time domain adaptive weight filter in electronic communication with the reference sensor, configured to apply an adaptive filtering process to the reference signal to produce a noise cancellation signal to cancel noise around ears of one or more vehicle occupants;

a plurality of speakers positioned within the vehicle cabin and in electronic communication with the time domain adaptive weight filter, configured to emit the noise cancellation signal into the vehicle cabin;

a plurality of physical error microphones positioned within the vehicle cabin and configured to acquire a residual signal resulting from interaction of the noise cancellation signal and the noise within the vehicle cabin; and a signal processing unit in electronic communication with the reference sensor, the plurality of speakers, and the plurality of physical error microphones, wherein the signal processing unit comprises:

a non-transitory memory storing a set of frequency domain subband filters, and instructions; and a processor, wherein, when executing the instructions, the processor is configured to:

estimate a frequency domain filtered virtual microphone signal from the noise cancellation signal and a residual physical error microphone signal, and a frequency domain filtered reference signal from the reference signal;

decompose the frequency domain filtered virtual microphone signal and the frequency domain filtered reference signal into a plurality of frequency domain subband signals;

calculate a frequency domain subband adaptive filter for each subband of the plurality of frequency domain subband signals to produce a plurality of frequency domain subband adaptive filters; and update the time domain adaptive weight filter based on a weighted transformation of the plurality of frequency domain subband adaptive filters.

12. The noise cancellation system of claim 11, wherein to estimate the frequency domain filtered virtual microphone signal from the noise cancellation signal and the residual signal, the processor is further configured to:

form a noise cancellation signal 2N block vector and a residual signal 2N block vector by respectively adding N zero blocks to the noise cancellation signal and the residual signal;

apply a Fast Fourier Transform (FFT) to the noise cancellation signal 2N block vector and the residual signal 2N block vector to produce a frequency domain noise cancellation signal and a frequency domain residual signal, wherein N is a block size equal to a full length of the time domain adaptive weight filter; and apply a plurality of secondary path filters to the frequency domain noise cancellation signal and the frequency domain residual signal.

13. The noise cancellation system of claim 12, wherein to estimate the frequency domain filtered reference signal from the reference signal, the processor is further configured to:

form a reference signal 2N block vector from the reference signal;

apply the FFT to the reference signal 2N block vector to produce a frequency domain reference signal, wherein N is the block size equal to the full length of the time domain adaptive weight filter; and apply a frequency domain estimated virtual secondary path filter to the frequency domain reference signal.

14. The noise cancellation system of claim 13, wherein to update the time domain adaptive weight filter based on the weighted transformation of the plurality of frequency domain subband adaptive filters, the processor is further configured to drop a last N zero block from an output of the weighted transformation of the plurality of frequency domain subband adaptive filters.

15. The noise cancellation system of claim 11, wherein the set of frequency domain subband filters comprise a plurality of subband filters derived from a prototype filter using high pass and low pass filters, each subband filter corresponding to a distinct frequency range within a vehicle cabin noise spectrum.

16. The noise cancellation system of claim 11, wherein the noise cancellation system is a multiple input multiple output active noise cancellation system.

17. A method for noise cancellation in a vehicle comprising:

acquiring a reference signal using a reference sensor, wherein the reference signal is correlated with noise in a vehicle cabin;

processing the reference signal with a time domain adaptive weight filter to produce a noise cancellation signal;

emitting the noise cancellation signal to cancel noise around ears of one or more vehicle occupants using a plurality of speakers positioned in the vehicle cabin;

acquiring a residual signal from a plurality of physical error microphones positioned in the vehicle cabin;

transforming the noise cancellation signal, the residual signal, and the reference signal into a frequency domain noise cancellation signal, a frequency domain residual signal, and a frequency domain reference signal, respectively, using a Fast Fourier Transform (FFT);

applying a plurality of secondary path filters to the frequency domain noise cancellation signal and the frequency domain residual signal to produce a frequency domain filtered estimated virtual microphone signal, and to the frequency domain reference signal to produce a frequency domain filtered reference signal;

applying a set of frequency domain subband filters to decompose the frequency domain filtered reference signal and the frequency domain filtered estimated virtual microphone signal respectively into a plurality of frequency domain subband filtered reference signals and a plurality of frequency domain filtered estimated virtual microphone signals;

determining a frequency domain subband gradient for each subband based on a frequency domain subband reference signal and a frequency domain subband error signal;

determining a frequency domain normalized step size for each subband based on a power contribution of the frequency domain subband reference signal and the frequency domain subband error signal;

updating a set of frequency domain subband adaptive filter weights based on the frequency domain subband gradient and the frequency domain normalized step size to produce an updated set of frequency domain subband adaptive filter weights;

transforming the updated set of frequency domain subband adaptive filter weights from a frequency domain to a time domain using Inverse Fast Fourier Transform to produce an updated time domain adaptive weight filter; and emitting the noise cancellation signal based on the updated time domain adaptive weight filter to reduce noise around the ears of the one or more vehicle occupants.

18. The method of claim 17, wherein transforming the noise cancellation signal, the residual signal, and the reference signal into the frequency domain noise cancellation signal, the frequency domain residual signal, and the frequency domain reference signal, respectively, using FFT, further comprises applying an overlap-save method to mitigate a wrap-around effect caused by circular correlation in the frequency domain.

19. The method of claim 18, wherein applying the overlap-save method comprises forming a noise cancellation signal 2N block vector and a residual signal 2N block vector by respectively adding N zero blocks to the noise cancellation signal and the residual signal, forming a reference signal 2N block vector, transforming the noise cancellation signal 2N block vector, the residual signal 2N block vector, and the reference signal 2N block vector to the frequency domain, and dropping a last N zero block from the updated time domain adaptive weight filter, wherein N is a block size equal to a full length of the time domain adaptive weight filter.

20. The method of claim 17, wherein the plurality of secondary path filters comprises a frequency domain estimated physical secondary path, a frequency domain estimated virtual secondary path, and a frequency domain estimated virtual path.

* * * * *